March 1, 1932.  R. W. KNAPP ET AL  1,847,249
COMBINATION TRACTOR IMPLEMENT
Filed Nov 19, 1927  12 Sheets-Sheet 2

INVENTORS
ROLAND W. KNAPP
HOLLAND J. KNAPP
BY
ATTORNEY

March 1, 1932.  R. W. KNAPP ET AL  1,847,249
COMBINATION TRACTOR IMPLEMENT
Filed Nov 19, 1927    12 Sheets-Sheet 3

Fig. 4.

INVENTORS
ROLAND W. KNAPP
HOLLAND J. KNAPP
BY

ATTORNEY.

March 1, 1932.   R. W. KNAPP ET AL   1,847,249
COMBINATION TRACTOR IMPLEMENT
Filed Nov 19, 1927    12 Sheets-Sheet 9

INVENTORS
ROLAND W. KNAPP
HOLLAND J. KNAPP
BY
ATTORNEY

Patented Mar. 1, 1932

1,847,249

UNITED STATES PATENT OFFICE

ROLAND W. KNAPP AND HOLLAND J. KNAPP, OF WAYZATA, MINNESOTA

COMBINATION TRACTOR IMPLEMENT

Application filed November 19, 1927. Serial No. 234,494.

This invention relates to tractors, to combination tractor-implements, and to implements for attachments to tractors, and one of the main objects is to provide a highly efficient, comparatively simple, and practical tractor unit, which is capable of independent use, as such, but which when coupled with an implement, or implements, in the manner hereinafter specified, is so associated with the same that the tractor is rendered particularly effective and valuable in assisting in the work of the implement, and, conversely, the implements are so associated with the tractor that they are rendered especially efficient for the work they are intended to do. A further object is to provide means of a novel nature for associating or connecting an implement with a tractor so that both the tractor and the implement may be under the observation and control of a single operator. A further object is to provide means for adjustably securing an implement, such as a tillage device, at the front end of the tractor, where it is most conveniently observed and controlled, but which means will also connect the implement to the rear end of the tractor by an element, independent of the tractor frame proper, whereby the tractor frame will not be subjected to the usual stresses and distortional reactions that occur where the implement is firmly attached to the end of the tractor that is opposite from the traction members.

Still further and more specific objects, such as are incident to improvements in implement structures proper, adjusting devices, power transmitting mechanisms, draft transmitting connections, etc., will be disclosed in the course of the following specification, reference being had to the accompanying drawings, wherein:

Referring to the drawings more particularly and by reference characters, A designates the power unit proper, which comprises the usual engine block 31, transmission housing 32, gasoline tank 33, radiator 34, a hood 35, and exhaust pipe 36. In the present instance the engine unit is one that has been taken from the well known Ford automobile, and as such utilizes the clutch, brake, and reverse speed, foot levers 37, 38 and 39 that are used in that type of engine.

Figure 16:
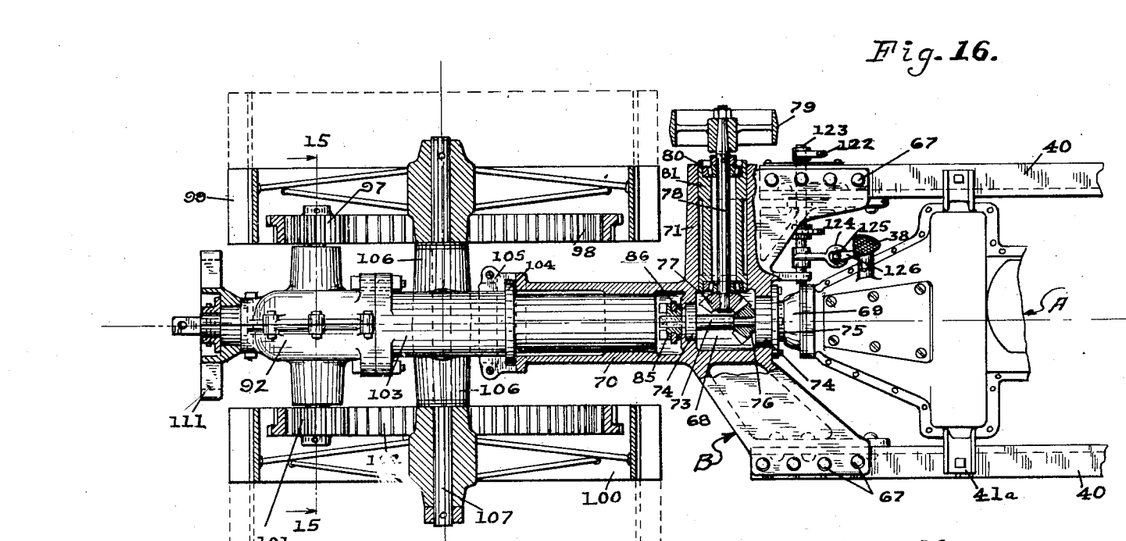
Fig. 16 is a plan view of the rear part of the tractor, with various parts shown in section for purpose of illustration.
Figure 17:
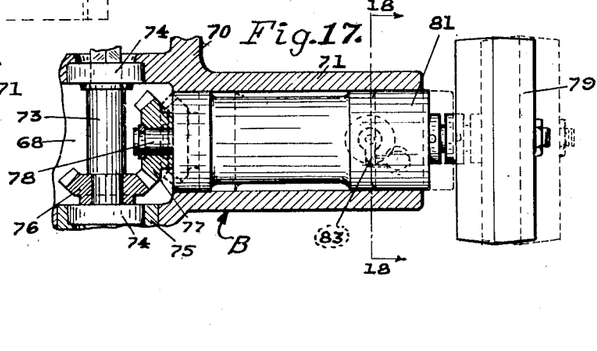
Fig. 17 is an enlarged detail view partly in section, of the power pulley and its driving and control mechanism.
Figure 18:
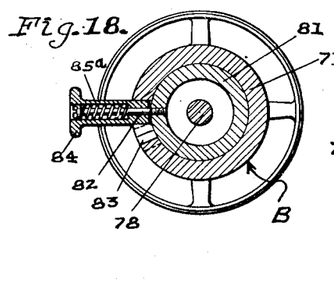
Fig. 18 is a detail section on the line 18—18 in Fig. 17.

The engine is carried by and secured to a pair of side frame members 40, as by brackets 41a. The rear ends of the side beams or sills 40 are rigidly connected by an integrally formed casting unit B (see Fig. 16), while the forward ends of the side beams incline upwardly to a point where they are connected by a transverse cross beam 41, which primarily and adjustably supports the front end of the tractor.

Figure 19:
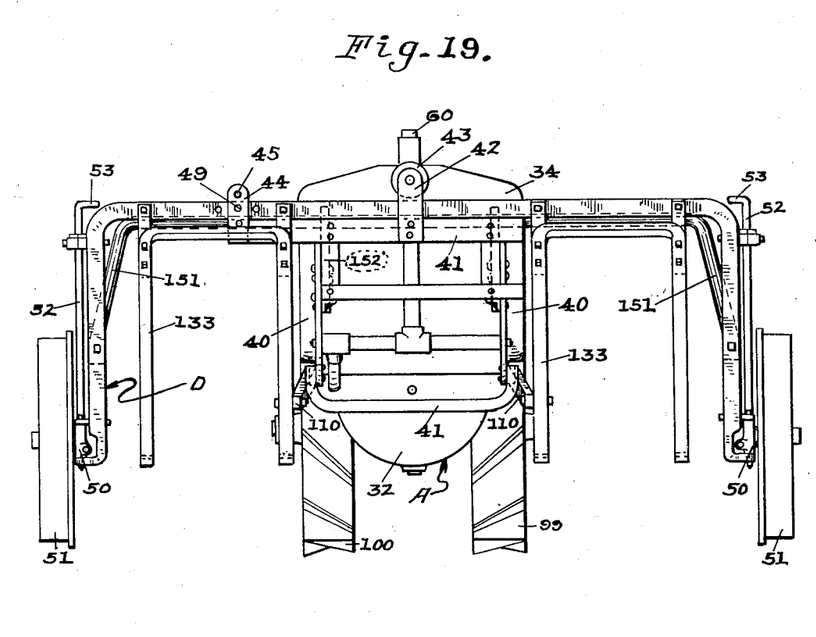
Fig. 19 is a front elevation of the machine, the same being provided with a modified form of forecarriage whereby a two row cultivator may be employed.
Figure 20:
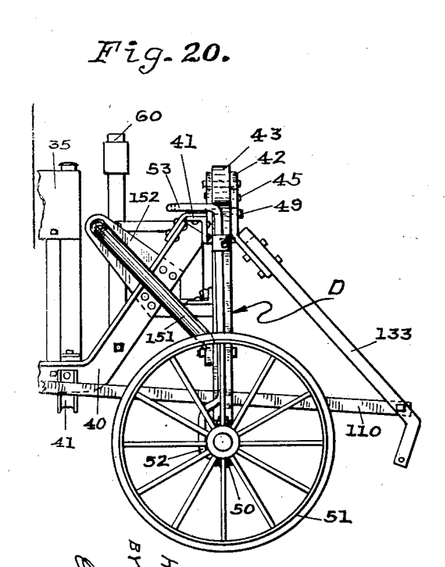
Fig. 20 is a side elevation of the modified forecarriage, as seen from the left in Fig. 19.

The beam 41 has a pair of brackets 42 that detachably secure a roller 43, and a pair of brackets 44 that similarly secure a guide pin 45. Slidably secured over the beam 41 and under the roller 43 and pin 45 is the upper horizontal rail 46 of an inverted, U-shaped frame C, as shown in Figs. 1, 2, 4, 8, 9, 10, 12, 21 and 22. The substituted but corresponding frame D, as illustrated in Figs. 19 and 20 will be described later.

Figures 2, 3:
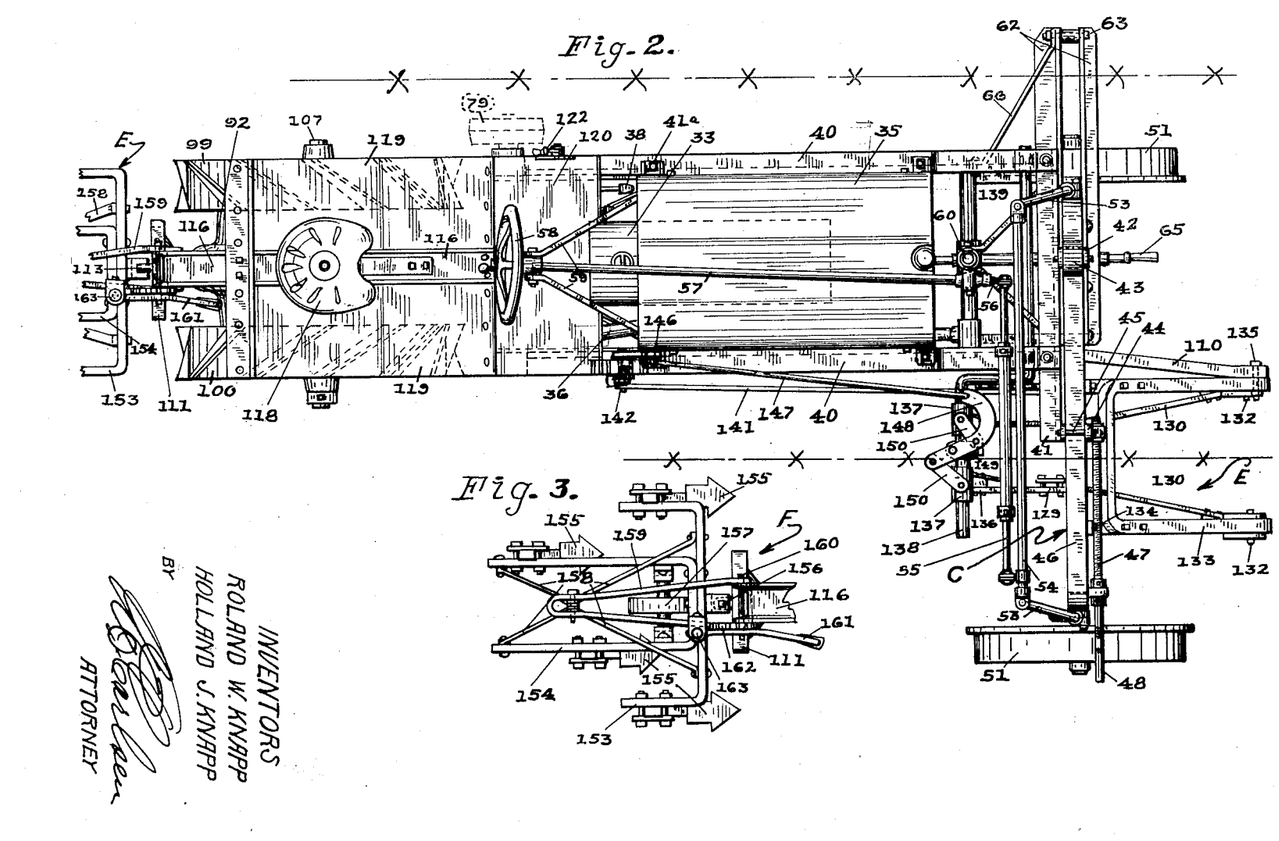
Fig. 2 is a plan view of the machine as shown in Fig. 1.
Fig. 3 is a plan view of the rear cultivator unit.
Figure 4:
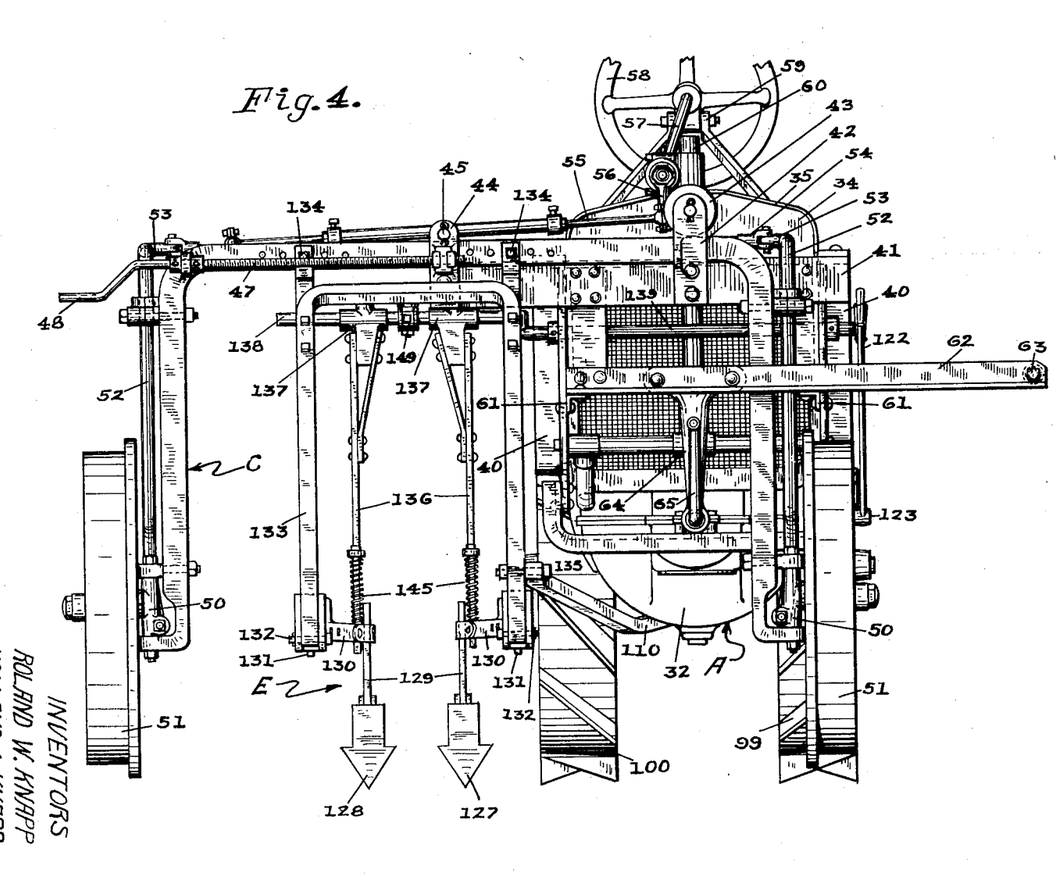
Fig. 4 is a front elevation of the machine as shown in Figs. 1 and 2.
Figure 9:
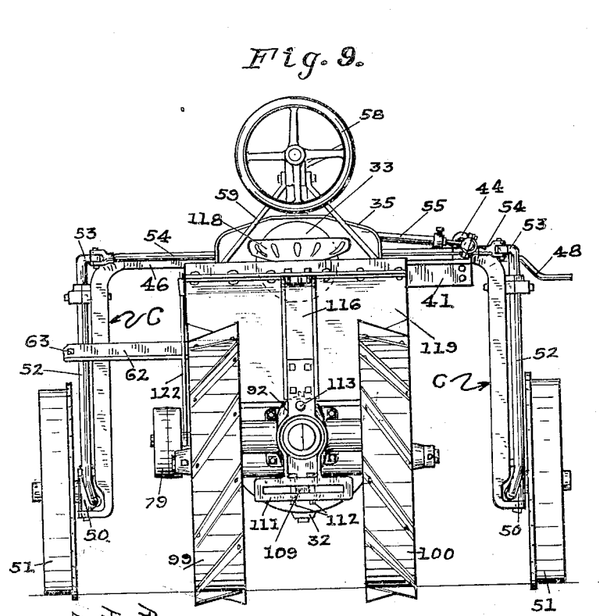
Fig. 9 is a rear elevation of the tractor, shown in Fig. 8.
Figure 10:
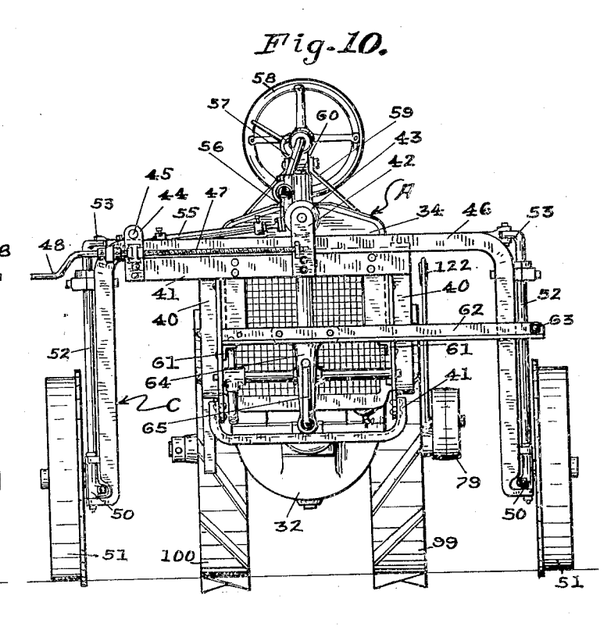
Fig. 10 is a front elevation of the tractor shown in Figs. 8 and 9.

As shown in Figs. 2, 4 and 10, the frame C is operatively connected to the bar or beam 41, by a threaded adjusting bar 47 having a handle 48. It will thus be seen that by turning the crank handle 48 the operator may easily effect a transverse adjustment between the two. Thus, in Figs. 9, 10 and 12 the frame C supports the front end of the tractor at a central or median point, but in Figs. 2, 4, 11 and 22 the frame is offset to one side of the tractor. In the relatively wider frame D, as shown in Fig. 19, the shifting bar 47 need not be employed as there is rarely occasion for transversely adjusting it, but it may be secured in properly adjusted positions, by a pin 49.

The lower ends of the frame C have spindles 50, for supporting ground wheels 51 that steer the machine. Each wheel is provided with a vertical turning shaft 52, and the two shafts have cranks 53 at their upper ends that are connected by a cross bar 54 so that they will turn or angle in unison. The cross bar in turn, is actuated by a bar 55 that connects it to the crank 56 of a steering shaft 57 having a hand wheel 58. The bar 55 is of a telescoping nature so that it may be rigidly adjusted to various lengths to accommodate such relative adjustments that may be made between the tractor and frame C, by the mechanism 47—48.

It may here be noted that the rear end of the steering shaft 57 is supported in a bearing member carried at the upper converging ends of a pair of brace bars 59 that extend down along the sides of the engine unit; and, that the forward end of the shaft 57 is supported by a tubular post 60. This post not only serves to support the shaft 57, but is open at its upper end and is tubularly connected at its lower end with the carbureter of the engine, so that the air drawn into the latter will be taken at a higher elevation, where it is much cleaner than when taken in at a lower point near the road or field.

Figure 11:
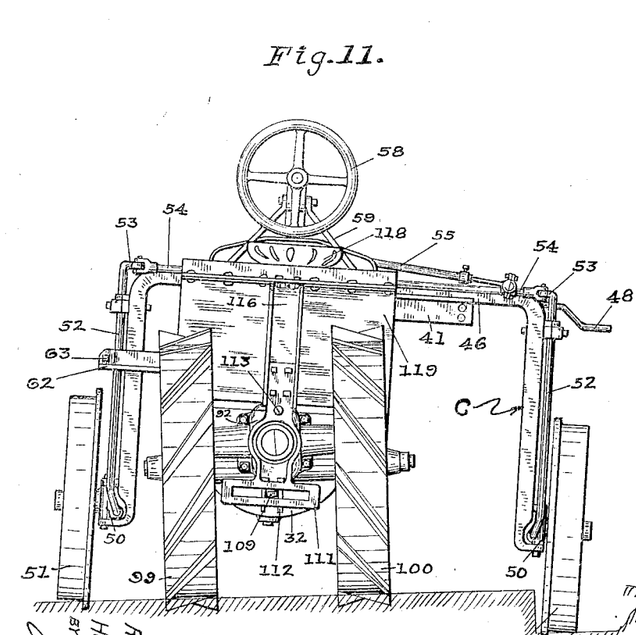
Fig. 11 is a rear view of the tractor, as seen in Fig. 9, but illustrating how the forward truck may be shifted to one side, and the position that various parts assume for instance when the machine is used in plowing.
Figure 12:
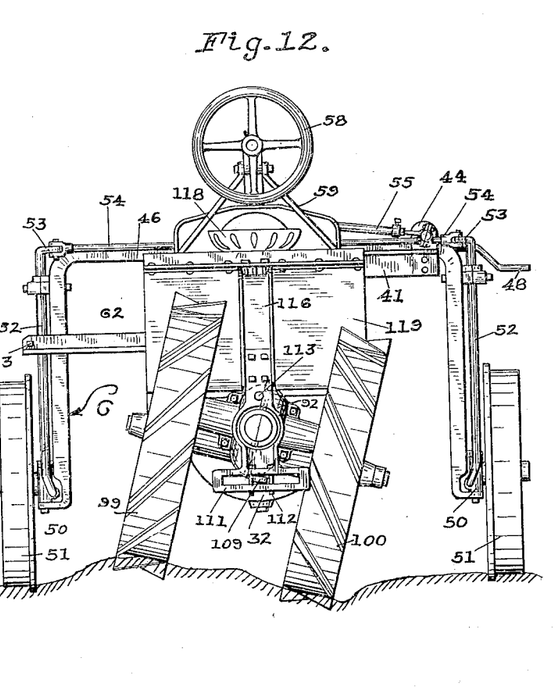
Fig. 12 is a rear elevation, similar to Fig. 9, but showing how the rear truck may tilt, independent of the tractor body proper, when the machine is travelling on uneven ground.
Figures 13, 14, 15:
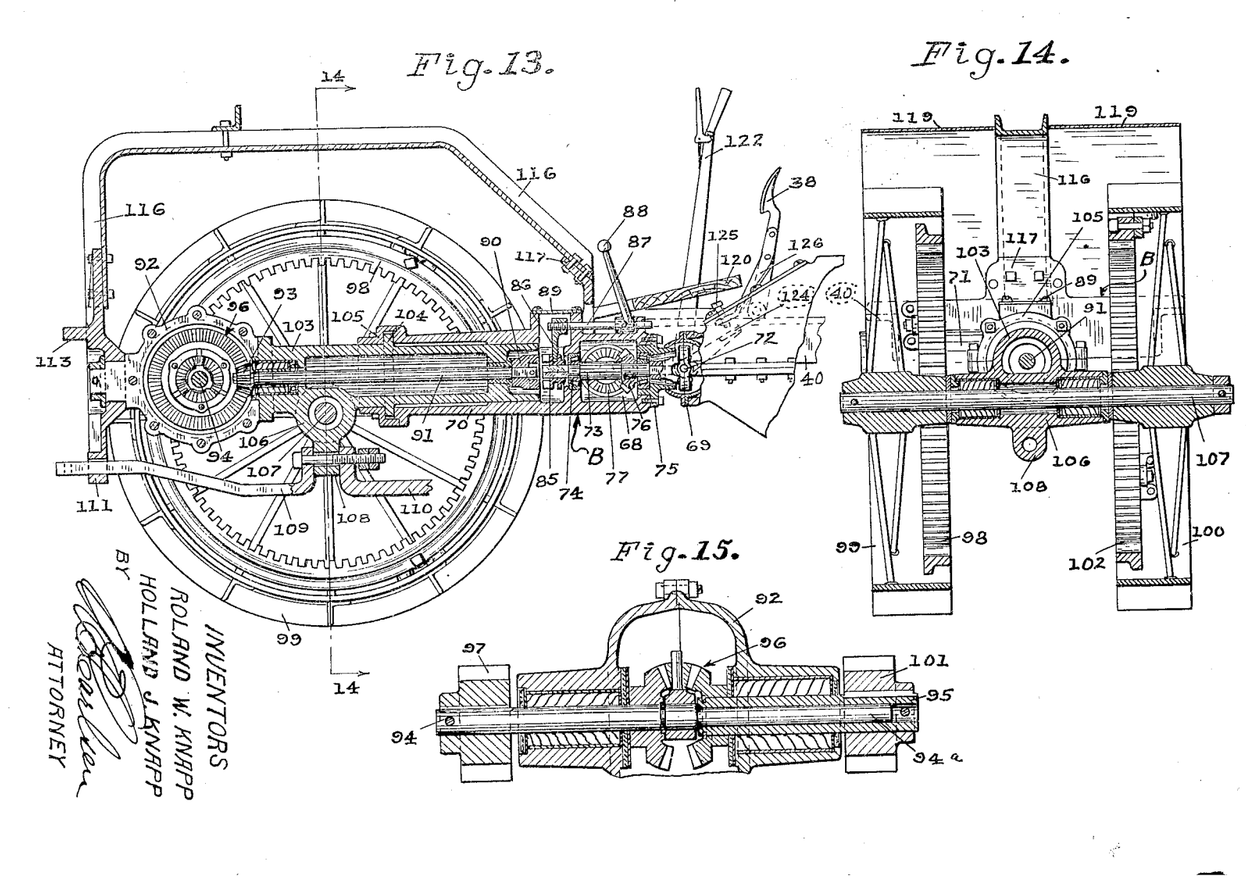
Fig. 13 is an enlarged sectional elevation as seen on a central plane taken vertically and longitudinally through the rear portion of the tractor unit.
Fig. 14 is a sectional elevation on the line 14—14 in Fig. 13.
Fig. 15 is an enlarged sectional elevation through the differential mechanism, as on the line 15—15 in Fig. 16, with a few parts removed.
Figure 22:
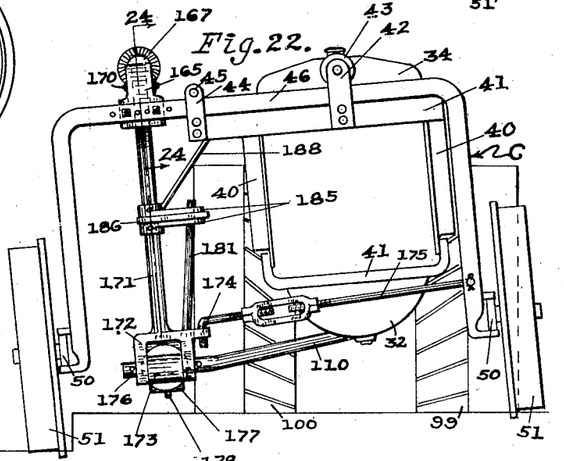
Fig. 22 is a front elevation of the machine shown in Fig. 21, but with the plow removed.
Figure 23:
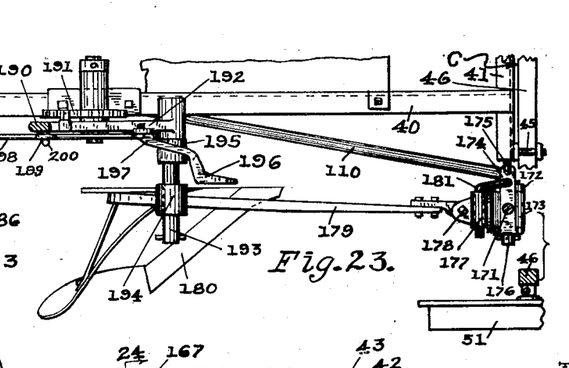
Fig. 23 is a sectional plan view on the line 23—23 in Fig. 21.
Figure 24:
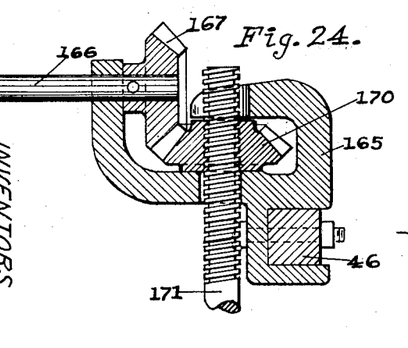
Fig. 24 is an enlarged detail section on the line 24—24 in Fig. 22.
Figures 25, 26, 27, 28, 29:
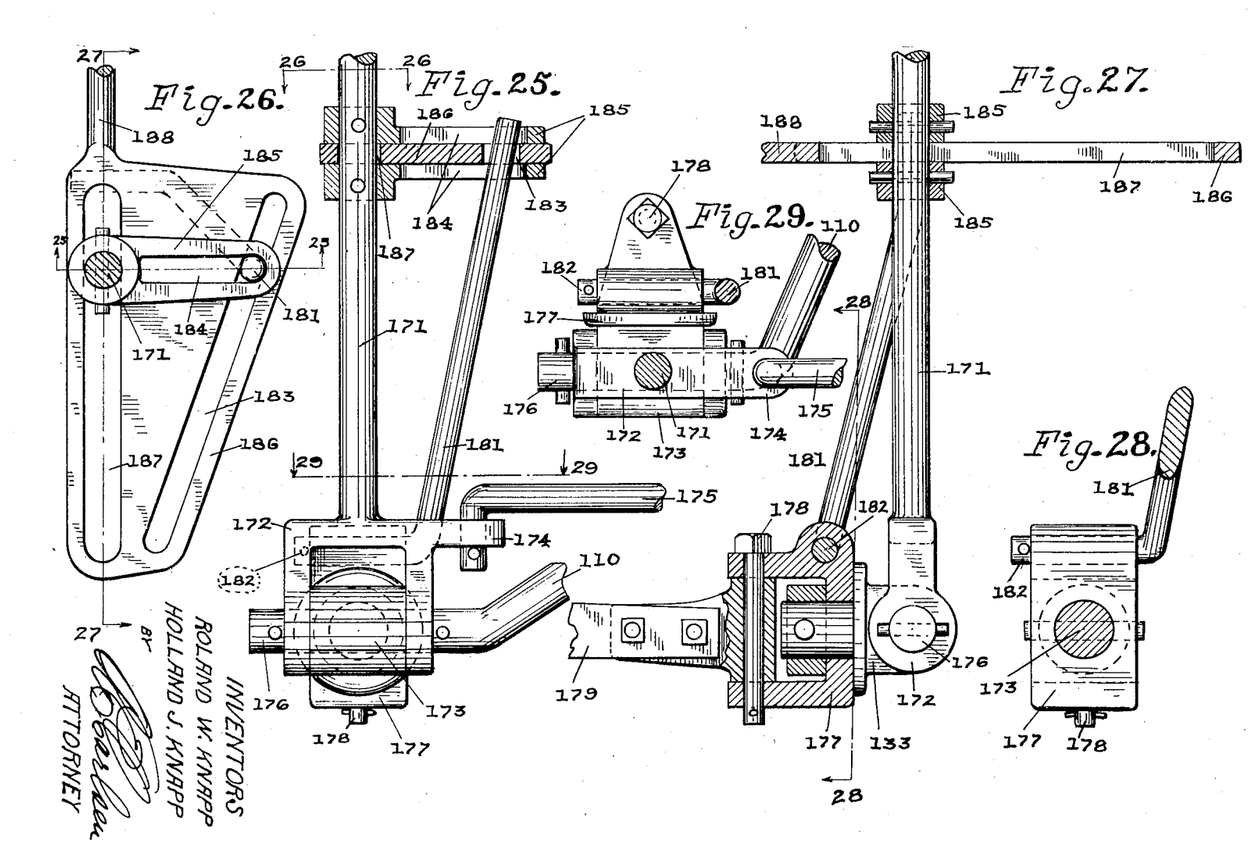
Fig. 25 is an enlarged detail elevation of the plow beam draft and adjusting mechanism as shown in Fig. 22, and partly in section, as on the line 25—25 in Fig. 26.
Fig. 26 is a detail plan view of an adjusting device, as on the line 26—26 in Fig. 25.
Fig. 27 is a sectional detail elevation, as on the line 27—27 in Fig. 26
Fig. 28 is a sectional detail elevation on the line 28—28 in Fig. 27.
Fig. 29 is a detail section on the line 29—29 in Fig. 25.

To retain the frame C in its vertical plane, yet transversely adjustable, we provide the forward sections of the frame bars 40 with a pair of extension arms 61 which carry a pair of spaced, parallel, and transversely extending guide bars 62. These bars slidably receive the left leg of the frame C, and are connected by bolts or rivets 63. An arm 64 is secured to and depends from the bars 62 to form a support for an extension of the engine crank 65. A rod 66 may be employed to brace the outer ends of the bars 62. It will thus be seen that while the forward truck or steering carriage of the tractor is adjustable from side to side, its connection with the tractor is such that the tractor will tilt with the front wheels, as shown in Figs. 11, 12 and 22, and not with the rear or traction wheels, as is usually the case.

Attention is now directed to the construction of the rear part of the tractor, and reference will particularly be made to the Figs. 1, 8, and 13 to 18, inclusive.

The casting B, which is rigidly secured to the rear ends of the sills 40, as at 67, has a central chamber 68, which is immediately rearward of the universal joint housing 69 of the engine A; a rearwardly extending tubular housing or sleeve 70, and a laterally extending, transverse sleeve 71. The universal joint 72 transmits power from the transmission gears of the engine to a short shaft 73 that extends through the chamber 68 and into the rear end of the sleeve 70. The shaft 73 is journaled in anti-friction bearings 74, one of which is carried in a bearing ring 75 secured in the forward end of the chamber 68.

Secured upon the shaft 73, within the chamber 68, is a bevel pinion 76 adapted to mesh with and drive a pinion 77 on the inner end of a shaft 78, whose outer end carries a power pulley 79 for stationary power purposes. The shaft 78 is journaled in bearings 80, in an inner sleeve 81, and the latter, is, in turn, mounted for limited movements, both longitudinal and rotating, in the outer sleeve 71. A pin 82 is rigidly secured to the sleeve 81 and projects out through an L-shaped slot 83 (in the sleeve 71) that is enlarged at both ends. A lug member 84 is secured on the pin 82, and a spring 85a tends to press this lug toward the sleeves. The lug is large enough to enter the enlargements at the ends of the slot 83, but is too large to move through the angle portion of the slot. When the lug is pulled out, however, the pin 82 may be moved through the slot. Thus, the sleeve 81 may be moved in and out far enough to throw the bevel pinion 77 into and out of engagement with the pinion 76, and consequently the pulley 79 may be engaged or disengaged from the engine, at will.

The rear end of the shaft 73, that projects into the sleeve 70, is squared, and slidably carries a clutch member 85, the longitudinal movement of which is controlled by a yoke 86, a sliding shaft 87, and a hand lever 88. Access, for greasing and repair, to this clutch is provided by removing a cover plate 89. The clutch member 85 is thus selectively made engageable with a complementing clutch member 90 (Fig. 13), on the rear end of a drive shaft 91 that extends back into a differential housing 92, where it is provided with a bevel pinion 93 that drives a pair of shafts 94 and 95 through a conventional form of differential gearing 96 (see Figs. 13 and 15). The shaft 94 has a spur pinion 97, at its outer end, that meshes with and drives an internal ring gear 98 of a traction wheel 99. The shaft 95 is a hollow shaft that operates upon a reduced extension 94a of the shaft 94, so as to be braced in alignment therewith, and drives a traction wheel 100 through a pinion 101 and an internal ring gear 102.

The drive shaft 91 is journaled in a cylindrical housing 103, to the rear end of which is rigidly secured the differential housing 92. The housing 103 is free to rotate in the sleeve 70 into which it extends, but is secured against longitudinal movement by a flange 104 that is secured as by a split ring 105. Rearwardly of the housing 70, the housing 103 is provided with an underslung, transversely arranged bearing box 106, in which is journaled a supporting axle 107 for the traction wheels 99—100. The hub of one of the wheels is secured upon the axle, while the hub of the other is rotatable thereon, so as to permit the differential mechanism to properly operate. The journal box 106 has a lug 108 to which may be secured a draw bar 109 and a push beam 110. The rear end of the draw bar rests in a horizontally slotted bracket 111 where it may be selectively secured, as by pins 112, as shown in Figs. 9, 11 and 12. We prefer, however, to provide means whereby the draw bar may be transversely adjusted by the operator, when the machine is in motion, so that various draft conditions may be dealt with as they occur, and to this end, we provide the bracket 111 with a pin 113, upon which is detachably secured (see Fig. 7) a hand lever 114, whose lower end is bifurcated to engage the draw bar, while its upper end is provided with a tooth and rack mechanism 115 for releasably securing it.

The bracket 111 is trunnioned on the rear end of the differential housing 92, and at its upper end is secured to the rear leg of a frame 116, that arches over the traction wheels and drive mechanism, and is secured at its front end to an extension 117 of the cast frame B. the driver's seat 118 is mounted upon this frame, and to protect the driver from the mechanism below, we provide the frame with a laterally extending plate skirt 119. At the front of this skirt is a support or foot board 120, carried on braces 121 that secure to the bars 59.

From the foregoing description it will be seen that the entire tractor unit proper, the frame 119, the operator's seat 118, and the bracket 111, will tilt transversely, only as the widely spaced front wheels 51 will tilt and that the traction wheels 99—100 will have freedom to tilt on a longitudinal axis, as provided for by the bearing of the housing 103 in the sleeve 70. It will also be seen that power can be applied, selectively, or simultaneously to both the traction wheels and to the power unit.

It may also here be noted that when a Ford engine is used the low, high and reverse speeds can be applied in the same manner as in the Ford automobile, and that the brake pedal 38 is available, in the usual manner, to apply the usual transmission brake. A hand lever 122 is shown as operatively connected to a shaft 103. These members may be the usual emergency brake lever and shaft of the Ford car, but as no emergency brake is here employed, we provide the shaft 123 with an arm 124 that operates against a set screw 125 in an extension 126 of the brake pedal 38, so that hand power may be applied to the hand lever 122 to supplement the foot power applied to the brake pedal 38.

When equipped as a row crop cultivating machine, as shown in Figs. 1-6, inclusive, the tractor wheels 99—100 travel between two adjacent rows of corn, or other crop, as does also the left front wheel 51, the frame C having been shifted to a right hand position so that it will arch over the row of plants immediately to the right, the right wheel 51 then travelling to the right of this row. To loosen up the earth immediately adjacent to the row spanned by the right side of the frame C we provide a pair of cultivator shovels or tools 127—128 of a cultivator unit designated generally by the character E, and to loosen up or plow the strip of earth between the plant rows, which strip is traversed by the traction wheels 99—100, we provide a cultivating unit designated, generally, by the character F.

The cultivating unit E may be described as follows: The tools 127—128 have shanks 129 that are secured to drag bars 130, the front ends of which are vertically pivoted, as at 131, and transversely pivoted, as at 132, to the lower ends of the legs of an inclined arched yoke 133, the upper end of which is detachably secured, as at 134, to the upper or horizontal beam of the frame C. Thus the unit E becomes transversely shiftable with the frame C, when the latter is adjusted by the crank 48, and the tools 127—128 are transversely shiftable, when the machine is in motion, by steering the wheels 51.

Figure 1:
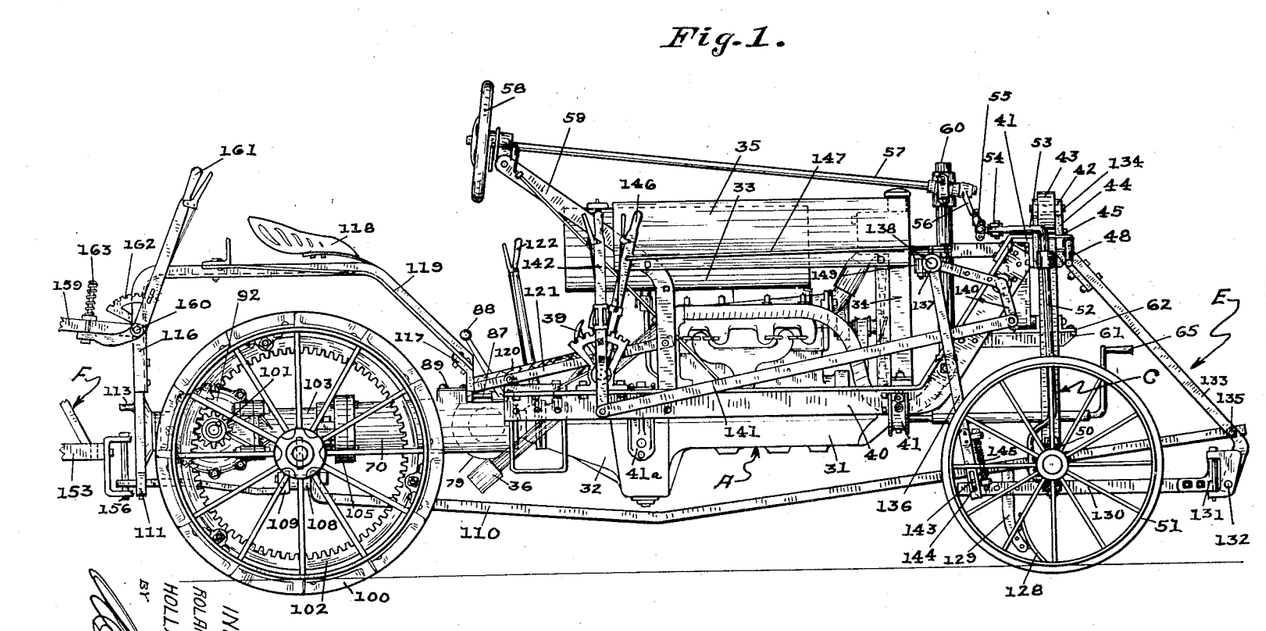
Fig. 1 is a side elevation of our improved tractor showing the method of applying front and rear cultivator units thereto, the major portion of the rear cultivator unit, however, being broken away for lack of space.

The unit E is braced and pushed by the push beam 110, which attaches, as at 135, to one leg of the yoke 133. The connecting bolts for the beam 110 have sufficient play to permit transverse shifting of the yoke 133, without binding. The rear or shovel supporting ends of the drag bars 130 are adjustably carried by a pair of bars 136, the upper ends of which have collars 137 that slidably operate on the crank end 138 of a cross shaft 139 which is journaled in the frame beams 40. This shaft is adjustably oscillated by a bracket arm 140, that is connected by a link rod 141, to a manually controlled adjusting lever 142. Thus, by adjusting the hand lever 142 the operator is able to lower and raise the cultivating tools as may be required. We also provide means whereby the tools may be yieldingly raised under the action of resisting obstructions which they may encounter in the ground. This is illustrated in Figs. 1 and 4, and consists in providing a yielding connection between the members 130 and 136. Thus, we provide each bar 136 with a slot 143 in which operates a pin 144 of the bar 130. The drag bars 130 are yieldingly pressed down by springs 145, but an unnatural strain on the shovels will permit the pins 144 to move up in the slots 143, so that the shovels may ride over the obstruction.

The proximity of the tools 127 and 128, with respect to each other, can be regulated, to meet varying crop row conditions, by the manipulation of a hand lever 146, by the machine operator. This lever is connected by a rod 147 to a goose neck lever 148 that pivots on a collar 149. This collar is secured upon the crank 138, between the collars 137, and the lever 148 is connected, at opposite sides of its fulcrum, by links 150, to the collars 137. It will thus be seen that as the hand lever 146 is shifted back and forth the collars 137, and consequently the shovels 127—128, will be moved apart and together, respectively.

In the modification shown in Figs. 19 and 20, the frame D is shown as of a width sufficient to accommodate two yokes 133, so that two units D may be carried, one at each side. In this event two push beams 110 are employed, and, in order to provide sufficient clearance for the crop row through the yokes 133, the bracing mechanism 61—64 is substituted by a bracing yoke 151, forwardly inclined ends of which attach to the legs of the yoke D, while its upper horizontal bar is slidably secured in brackets 152, carried by the frame beams 40.

Figures 5, 6, 7:
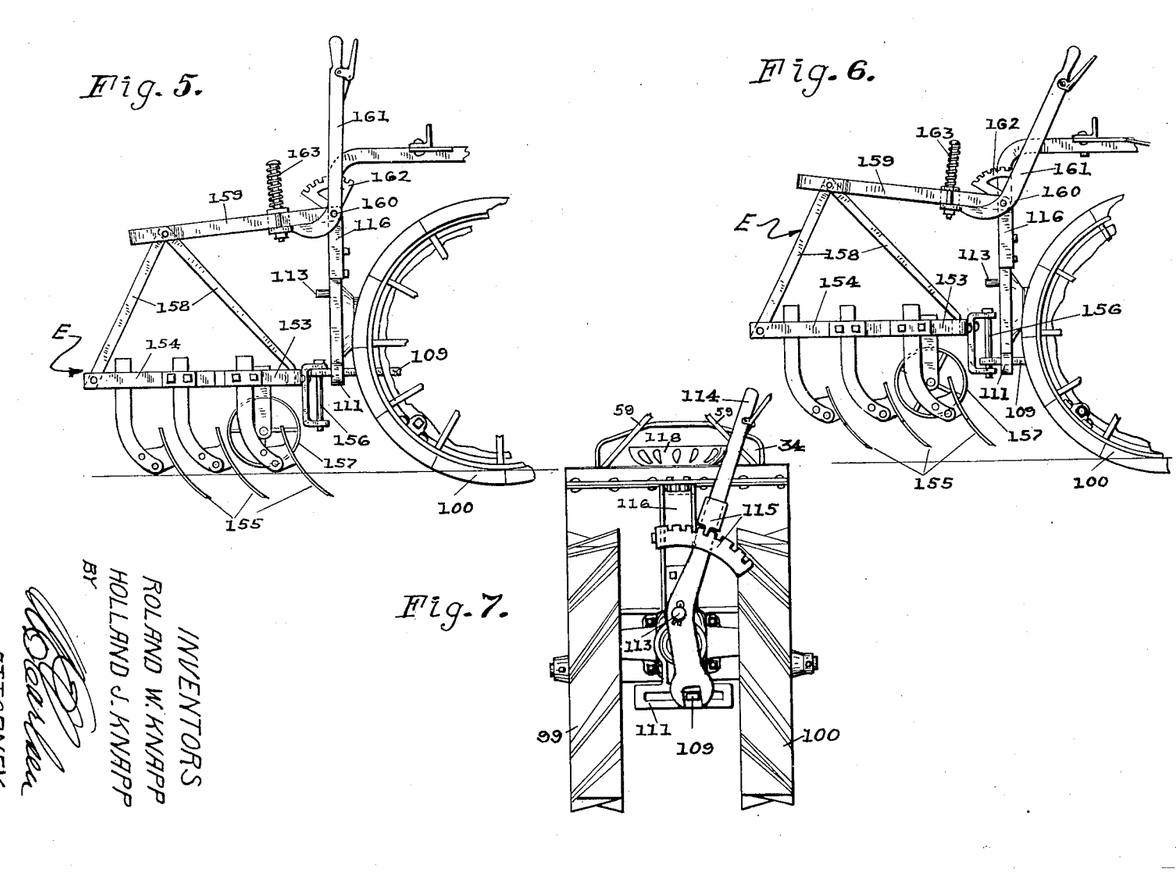
Fig. 5 is a side elevation of the rear cultivator unit, as it would be seen if applied to the rear (left) end of the tractor as seen in Fig. 1, the earth engaging devices being shown as in working engagement with the soil.
Fig. 6 is a view similar to Fig. 5 but showing the earth engaging devices in their lifted and inoperative positions.
Fig. 7 is a rear elevation of the rear end or the tractor unit proper, and showing a draw bar adjusting mechanism.
Figure 8:
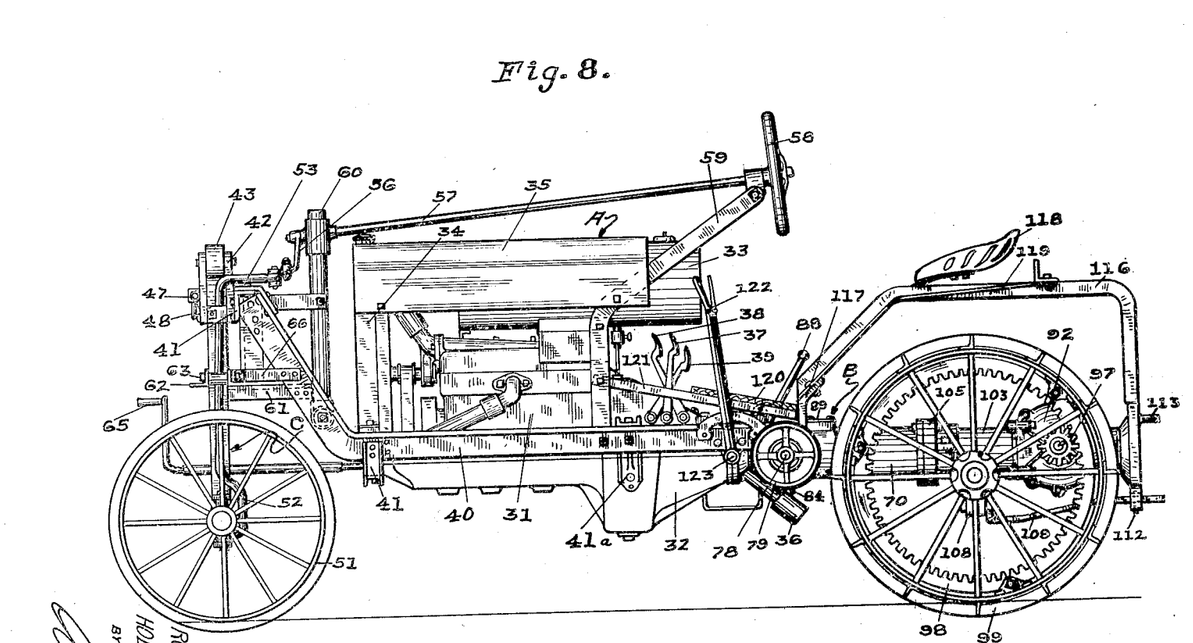
Fig. 8 is a side elevation (from the left) of the tractor unit proper, and as seen when stripped of all working implements.

The cultivating unit E, at the rear of the machine, may be described as follows; with particular reference to Figs. 3, 5, and 6, although parts of this device are also shown in Figs. 1 and 2. The unit has a horizontal frame consisting of two relatively wide and narrow V-shaped members 153 and 154, secured together at their forward portions, and whose rearwardly extending legs carry a series of cultivator tools 155. The frame is secured to the draw bar 109 by a bolt 156 which has freedom for vertical movement in the draw bar. The frame is also provided with a roller or wheel 157 to limit the working depth of the tools and prevent them from going too deep into the ground. The frame is primarily carried or supported by set of depending bars 158, that converge upwardly, attaching at their upper ends to a rearwardly extending supporting member 159 that pivots to the frame 116, as at 160. The member 159 is raised and lowered by a hand lever 161 that also pivots as at 160, and with its shorter end engages under the member 159. The lever 161 is secured in various adjusted positions on a segment 162, but in order that the frame may yield upwardly, as when the shovels travel over large rocks and the like, the member 159 is raisable, with respect to the lever 161, under the yielding action of a spring 163. It may be noted that when the rear cultivator unit is raised and lowered, by the hand lever 161, it will always maintain a substantially horizontal position due to the sliding action of the bolt 156 in the draw bar 111, with a result that the shovels will always operate on a uniform level, whether working deep or shallow in the ground.

Attention is now directed to Figs. 21 to 29, inclusive, wherein is shown a tillage attachment in the form of a plowing unit. In this event, the frame C, which is transversely adjustable, as before, is provided with a casting 165, in one arm of which is journaled the front end of a shaft 166, having a bevel pinion 167. The rear end of this shaft is mounted as at 168 and has a hand wheel 169. The pinion 167 meshes with and drives a pinion 170 that threads on a vertical shaft 171, so that when the hand wheel 169 is turned the shaft 171 will be raised and lowered, as desired. At its lower end, the shaft 171 is bifurcated, as at 172, to pivotally receive the hub of a casting 173, and at its lower end the shaft 171 is also provided with a lug 174 that is connected and braced, with respect to the left side of the frame C, as by an adjustable tie rod, 175. In the present instance the push beam 110 is slightly modified over the one previously described, it here being provided with an angular extension 176, that extends through the members 172 and 173 to pivotally connect them. Upon the casting 173 is trunnioned a cast collar 177, to which is connected, by a vertical pivot pin 178, the front end of a plow beam 179 that carries a conventional plow 180 at its rear. The plow and its beam may be turned or tilted, on a longitudinal axis, by turning the member 177 on the casting 133. This is done, as follows: An actuator bar 181 has an angular extension 182, at its lower end, that transversely pivots in the member 177. The upper end of the bar engages and guides in crossed slots 183 and 184, at their intersection. The slots 184 are in parallel, spaced bracket arms 185 that are rigidily secured upon the shaft 171. The slot 183 is in a plate 186 that guides between the arms 185 and has a second slot 187, at an angle with respect to the slot 183, that guides on the shaft 171. The plate 186 continues in an integrally formed central rod 188, with a handle 189 at its rear end within the control of the operator. It will now be seen that when the operator moves the handle 189 forward, the bar 181 will be moved outwardly in the slots 184, and the plow beam 179 will be tilted to the left, and, conversely, the plow may be tilted to right by pulling the handle 189 rearwardly. This feature, i. e., the lateral tilting of the plow, we consider as of primary importance in a tillage implement of this nature, as it enables the operator to accurately control the angle of the plow when working in uneven or rough soil conditions, and thus prevents the natural tendency of the plow to drift to one side or the other when it is improperly positioned in the ground or when it has a fixed relation to the tractor.

The plow 180 is raised from and lowered into the soil by a hand lever 190, that is adjustable with respect to a fixed segment 191. This lever has a forwardly extending arm 192, provided with a pin or short shaft 193 that slidably engages in a slotted link 194, whose lower end pivots to the plow beam 179. Thus, the plow may raise when riding over an obstruction, and as the link 194 has a limited sliding movement on the shaft 193 the plow beam may be swung laterally as ground and draft conditions may require.

Figure 21:
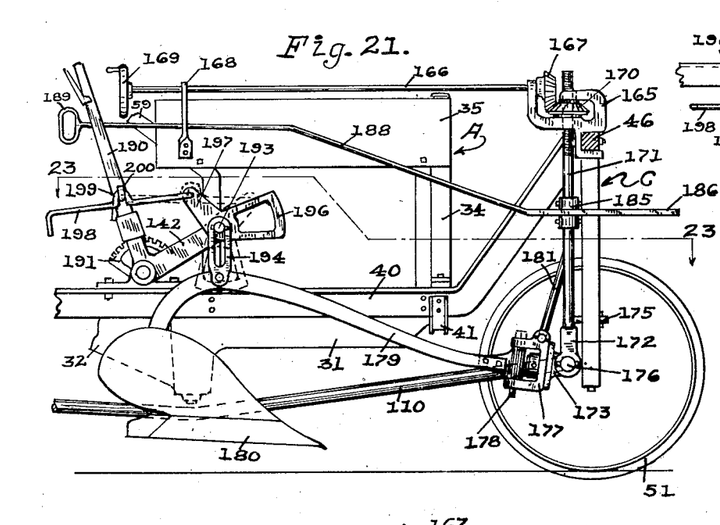
Fig. 21 is a right side elevation of the front portion of the machine, showing it as having a plow device connected thereto, and with certain parts broken away for purpose of illustration.

Rotatably secured upon the shaft 193 is a collar 195, having an integrally formed bracket arm 196 that continues in a second arm 197. Extending rearwardly from the arm 197 is a control rod 198 having a notch forming loop 199 adapted to releasably engage a rest pin 200, carried by the hand lever 190. When the loop 199 is seated over the pin 200 the bracket arm 196 is in a raised position as shown in Fig. 21. When the rod 198 is lifted and moved forward, however, the bracket arm 196 drops to the dotted line position, immediately to the left of the plow beam, and when this occurs it is seen that the plow beam cannot move to the left any more than the bracket 196 will permit. Ordinarily no such bracing is required for the plow, as the hard ground to the left of the furrow will sufficiently offset the pressure reaction imparted by the turning earth strip. In plowing over the last strip of a field, however, or any other strip where the land-side of the plow is not braced by firm earth, there will be a natural tendency of the plow to drift too far to the left, and to eliminate this, as well as the difficulty of attempting to guide the plow, under such circumstances, we have provided the mechanism 195—200.

It will be seen from the foregoing that the plow 180 is mounted so that it is under the complete control of the operator; that it can be adjusted in any manner desired; that it is guided by the widely spaced front wheels, which are more stable in their movement over the ground than the rear, traction wheels; that the propelling power for the plow is transmitted directly through the beams 110 and 179; and, that the rear, traction wheels will always travel on unplowed, firm soil, all of which features combine to form an efficient and practical plowing machine.

It is understood that suitable modifications may be made in the general design and structural details of the invention as herein shown, provided, however, that said modifications come within the spirit and scope of the appended claims. Having now therefore fully shown and described our invention, what we claim to be new and desire to protect by Letters Patent is:

1. A tractor comprising a frame having an arched forecarriage secured against transverse tilting with respect to the frame, a power plant on the frame, a sleeve extending rearwardly from the frame for tiltably supporting the rear end thereof, a traction truck oscillatably connected to the sleeve so as to be tiltable with respect to the frame, and a power connection between the truck and power plant.

2. A tractor comprising a frame having an arched forecarriage secured against transverse tilting with respect to the frame, a power plant on the frame, a sleeve extending rearwardly from the frame for tiltably supporting the rear end thereof, a traction truck oscillatably connected to the sleeve so as to be tiltable with respect to the frame, and a power connection extending from the power plant through the sleeve and to the traction truck.

3. A traction comprising an arched forecarriage, a frame secured at its front end to the forecarriage so as to be supported by and transversely tiltable therewith, an engine on the frame, a truck unit having a pair of traction wheels disposed rearwardly of the frame, a pivotal supporting connection between the rear end of the frame and the truck, and a power connection between the engine and the traction wheels.

4. A tractor comprising an arched forecarriage, a frame secured at its front end to the forecarriage so as to be supported by and transversely tiltable therewith, an engine on the frame, a truck unit having a pair of traction wheels disposed rearwardly of the frame, a pivotal supporting connection between the rear end of the frame and the truck, and a power connection extending from the engine through the supporting connection to the traction wheels of the truck.

5. A tractor comprising an arched forecarriage, a frame secured at its front end to the forecarriage so as to be supported by and transversely tiltable therewith, an engine on the frame, a truck unit having a pair of traction wheels disposed rearwardly of the frame, a sleeve extending rearwardly from the frame to support the same, and a housing member extending forwardly of the truck for pivotal supporting engagement with the sleeve.

6. A tractor comprising an arched forecarriage, a frame secured at its front end to the forecarriage so as to be supported by and transversely tiltable therewith, an engine on the frame, a truck unit having a pair of traction wheels disposed rearwardly of the frame, a sleeve extending rearwardly from the frame to support the same, and a housing member extending forwardly of the truck for pivotal supporting engagement with the sleeve, said sleeve and housing member serving as an enclosure for the power drive connection between the engine and the traction wheels.

7. A tractor comprising a frame, an engine on the frame, an arched forecarriage at the front end of the frame and held against transverse tilting with respect thereto, a pair of traction wheels arranged rearwardly of the frame, a housing unit extending between the wheels and having longitudinal pivotal supporting engagement with the rear end of the frame, said housing having an intermediate transverse portion for supporting engagement with the wheels, a differential mechanism in the rear of the housing and having a pair of laterally arranged drive pinions for driving engagement with the traction wheels.

8. A tractor comprising a frame having an engine thereon, a traction truck tiltably supporting the rear end of the frame, an arched forecarriage supporting the front end of the frame and held against transverse tilting with respect thereto, said carriage having a transverse sliding connection with the frame, a transversely extending brace slidably bracing and connecting the frame and forecarriage, and means for transversely adjusting the forecarriage.

9. A tractor comprising a frame having an engine thereon, a traction truck tiltably supporting the rear end of the frame, an arched forecarriage supporting the front end of the frame and held against transverse tilting with respect thereto, said carriage having a transverse sliding connection with the frame, and means independent of the connection for slidably bracing the forecarriage with respect to the frame.

10. A tractor comprising a frame having an engine thereon, a traction truck tiltably supporting the rear end of the frame, an arched forecarriage supporting the front end of the frame and held against transverse tilting with respect thereto, said carriage having a transverse sliding connection with the frame, transversely extending means independent of the connection for bracing the forecarriage, and manually operative screw acting means carried by the tractor for gradually adjusting the front end of the frame transversely with respect to the forecarriage.

In testimony whereof we affix our signatures.

ROLAND W. KNAPP.
HOLLAND J. KNAPP.